United States Patent
Salter et al.

(10) Patent No.: US 10,400,978 B2
(45) Date of Patent: Sep. 3, 2019

(54) PHOTOLUMINESCENT LIGHTING APPARATUS FOR VEHICLES

(71) Applicant: Ford Global Technologies, LLC, Dearborn, MI (US)

(72) Inventors: Stuart C. Salter, White Lake, MI (US); John Matthew Teodecki, Grosse Pointe Park, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 744 days.

(21) Appl. No.: 14/801,056

(22) Filed: Jul. 16, 2015

(65) Prior Publication Data

US 2015/0323149 A1 Nov. 12, 2015

Related U.S. Application Data

(63) Continuation-in-part of application No. 14/603,636, filed on Jan. 23, 2015, now Pat. No. 9,573,517, which
(Continued)

(51) Int. Cl.
*F21S 43/14* (2018.01)
*F21S 43/13* (2018.01)
(Continued)

(52) U.S. Cl.
CPC ............. *F21S 43/14* (2018.01); *B60Q 1/26* (2013.01); *B60Q 1/2607* (2013.01);
(Continued)

(58) Field of Classification Search
CPC .. F21S 48/115; F21S 48/1233; F21S 48/1241; F21S 48/125; F21S 48/1347;
(Continued)

(56) References Cited

U.S. PATENT DOCUMENTS

| 2,486,859 A | 11/1949 | Meijer et al. |
| 5,053,930 A | 10/1991 | Benavides |

(Continued)

FOREIGN PATENT DOCUMENTS

| CN | 101337492 A | 1/2009 |
| CN | 201169230 Y | 2/2009 |

(Continued)

OTHER PUBLICATIONS

Dupont OLED Technology Enables Next-Generation, Large-Format Displays with Significant Manufacturing Cost Savings, pp. 1-5, 2012.
(Continued)

*Primary Examiner* — Bap Q Truong
(74) *Attorney, Agent, or Firm* — Vichit Chea; Price Heneveld LLP

(57) ABSTRACT

A vehicle taillight is disclosed. The vehicle taillight comprises an at least partially light transmissive layer and at least one light generating layer configured to substantially coat a portion of the transmissive layer. The light generating layer comprises a plurality of electrodes and a plurality of LEDs in a semiconductor ink disposed between the electrodes. The light generating layer is operable to emit an excitation emission. The taillight further comprises at least one photoluminescent layer proximate at least one of the electrodes configured to convert the excitation emission to an output emission.

18 Claims, 8 Drawing Sheets

Related U.S. Application Data is a continuation-in-part of application No. 14/086,442, filed on Nov. 21, 2013, now abandoned.

(51) Int. Cl.
  *F21S 43/20* (2018.01)
  *H05B 37/02* (2006.01)
  *B60Q 1/26* (2006.01)
  *B60Q 1/30* (2006.01)
  *F21S 41/16* (2018.01)
  *F21Y 115/10* (2016.01)

(52) U.S. Cl.
  CPC .............. *B60Q 1/2661* (2013.01); *B60Q 1/30* (2013.01); *B60Q 1/302* (2013.01); *F21S 41/16* (2018.01); *F21S 43/13* (2018.01); *F21S 43/26* (2018.01); *H05B 37/0218* (2013.01); *H05B 37/0227* (2013.01); *B60Q 2400/20* (2013.01); *F21Y 2115/10* (2016.08); *Y02B 20/46* (2013.01)

(58) Field of Classification Search
  CPC .. F21S 43/14; F21S 43/13; F21S 41/16; F21S 43/26; B60Q 13/005; B60Q 1/26; B60Q 1/2607; B60Q 1/2661; B60Q 1/30; B60Q 1/302; B60Q 2400/20; H05B 37/0218; H05B 37/0227; F21Y 2115/10; Y02B 20/46; F21V 3/08; F21V 3/12; F21V 5/10; F21V 7/26; F21V 7/30; F21V 9/30; F21V 9/32; F21V 9/45
  See application file for complete search history.

(56) References Cited

U.S. PATENT DOCUMENTS

| | | | |
|---|---|---|---|
| 5,434,013 | A | 7/1995 | Fernandez |
| 5,709,453 | A | 1/1998 | Krent et al. |
| 5,839,718 | A | 11/1998 | Hase et al. |
| 5,931,566 | A | 8/1999 | Fraizer |
| 6,031,511 | A | 2/2000 | DeLuca et al. |
| 6,117,362 | A | 9/2000 | Yen et al. |
| 6,294,990 | B1 | 9/2001 | Knoll et al. |
| 6,419,854 | B1 | 7/2002 | Yocom et al. |
| 6,471,368 | B1 | 10/2002 | Lin |
| 6,494,490 | B1 | 12/2002 | Trantoul |
| 6,520,669 | B1 | 2/2003 | Chen et al. |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |
| 7,015,893 | B2 | 3/2006 | Li et al. |
| 7,161,472 | B2 | 1/2007 | Strumolo et al. |
| 7,213,923 | B2 | 5/2007 | Liu et al. |
| 7,216,997 | B2 | 5/2007 | Anderson, Jr. |
| 7,249,869 | B2 | 7/2007 | Takahashi et al. |
| 7,264,366 | B2 | 9/2007 | Hulse |
| 7,264,367 | B2 | 9/2007 | Hulse |
| 7,347,576 | B2 | 3/2008 | Wang et al. |
| 7,441,914 | B2 | 10/2008 | Palmer et al. |
| 7,501,749 | B2 | 3/2009 | Takeda et al. |
| 7,575,349 | B2 | 8/2009 | Bucher et al. |
| 7,579,773 | B2 | 8/2009 | Forrest et al. |
| 7,635,212 | B2 | 12/2009 | Seidler |
| 7,726,856 | B2 | 6/2010 | Tsutsumi |
| 7,745,818 | B2 | 6/2010 | Sofue et al. |
| 7,753,541 | B2 | 7/2010 | Chen et al. |
| 7,834,548 | B2 | 11/2010 | Jousse et al. |
| 7,862,220 | B2 | 1/2011 | Cannon et al. |
| 7,987,030 | B2 | 7/2011 | Flores et al. |
| 8,016,465 | B2 | 9/2011 | Egerer et al. |
| 8,022,818 | B2 | 9/2011 | la Tendresse et al. |
| 8,044,415 | B2 | 10/2011 | Messere et al. |
| 8,066,416 | B2 | 11/2011 | Bucher |
| 8,071,988 | B2 | 12/2011 | Lee et al. |
| 8,097,843 | B2 | 1/2012 | Agrawal et al. |
| 8,118,441 | B2 | 2/2012 | Hessling |
| 8,120,236 | B2 | 2/2012 | Auday et al. |
| 8,136,425 | B2 | 3/2012 | Bostick |
| 8,163,201 | B2 | 4/2012 | Agrawal et al. |
| 8,169,131 | B2 | 5/2012 | Murazaki et al. |
| 8,178,852 | B2 | 5/2012 | Kingsley et al. |
| 8,197,105 | B2 | 6/2012 | Yang |
| 8,203,260 | B2 | 6/2012 | Li et al. |
| 8,207,511 | B2 | 6/2012 | Bortz et al. |
| 8,232,533 | B2 | 7/2012 | Kingsley et al. |
| 8,247,761 | B1 | 8/2012 | Agrawal et al. |
| 8,261,686 | B2 | 9/2012 | Birman et al. |
| 8,286,378 | B2 | 10/2012 | Martin et al. |
| 8,299,787 | B2 | 10/2012 | Nakayama et al. |
| 8,317,329 | B2 | 11/2012 | Seder et al. |
| 8,317,359 | B2 | 11/2012 | Harbers et al. |
| 8,408,766 | B2 | 4/2013 | Wilson et al. |
| 8,415,642 | B2 | 4/2013 | Kingsley et al. |
| 8,421,811 | B2 | 4/2013 | Odland et al. |
| 8,459,832 | B2 | 6/2013 | Kim |
| 8,466,438 | B2 | 6/2013 | Lambert et al. |
| 8,519,359 | B2 | 8/2013 | Kingsley et al. |
| 8,519,362 | B2 | 8/2013 | Labrot et al. |
| 8,539,702 | B2 | 9/2013 | Li et al. |
| 8,552,848 | B2 | 10/2013 | Rao et al. |
| 8,606,430 | B2 | 12/2013 | Seder et al. |
| 8,624,716 | B2 | 1/2014 | Englander |
| 8,631,598 | B2 | 1/2014 | Li et al. |
| 8,653,553 | B2 | 2/2014 | Yamazaki et al. |
| 8,664,624 | B2 | 3/2014 | Kingsley et al. |
| 8,683,722 | B1 | 4/2014 | Cowan |
| 8,724,054 | B2 | 5/2014 | Jones |
| 8,754,426 | B2 | 6/2014 | Marx et al. |
| 8,773,012 | B2 | 7/2014 | Ryu et al. |
| 8,846,184 | B2 | 9/2014 | Agrawal et al. |
| 8,851,694 | B2 | 10/2014 | Harada |
| 8,876,352 | B2 | 11/2014 | Robbins et al. |
| 8,905,610 | B2 * | 12/2014 | Coleman ............. G02B 6/0018 362/554 |
| 8,952,341 | B2 | 2/2015 | Kingsley et al. |
| 8,994,495 | B2 | 3/2015 | Dassanayake et al. |
| 9,006,751 | B2 | 4/2015 | Kleo et al. |
| 9,018,833 | B2 | 4/2015 | Lowenthal et al. |
| 9,057,021 | B2 | 6/2015 | Kingsley et al. |
| 9,059,378 | B2 | 6/2015 | Verger et al. |
| 9,065,447 | B2 | 6/2015 | Buttolo et al. |
| 9,067,530 | B2 | 6/2015 | Bayersdorfer et al. |
| 9,187,034 | B2 | 11/2015 | Tarahomi et al. |
| 9,299,887 | B2 | 3/2016 | Lowenthal et al. |
| 9,315,148 | B2 | 4/2016 | Schwenke et al. |
| 9,452,709 | B2 | 9/2016 | Kburto Crespo |
| 9,568,659 | B2 | 2/2017 | Verger et al. |
| 9,616,812 | B2 | 4/2017 | Sawayanagi |
| 9,797,575 | B2 * | 10/2017 | Salter ................. H05B 37/0218 |
| 2002/0159741 | A1 | 10/2002 | Graves et al. |
| 2002/0163792 | A1 | 11/2002 | Formoso |
| 2003/0167668 | A1 | 9/2003 | Fuks et al. |
| 2003/0179548 | A1 | 9/2003 | Becker et al. |
| 2004/0213088 | A1 | 10/2004 | Fuwausa |
| 2005/0084229 | A1 | 4/2005 | Babbitt et al. |
| 2005/0189795 | A1 | 9/2005 | Roessler |
| 2006/0087826 | A1 | 4/2006 | Anderson, Jr. |
| 2006/0097121 | A1 | 5/2006 | Fugate |
| 2006/0209551 | A1 | 9/2006 | Schwenke et al. |
| 2007/0032319 | A1 | 2/2007 | Tufte |
| 2007/0285938 | A1 | 12/2007 | Palmer et al. |
| 2007/0297045 | A1 | 12/2007 | Sakai et al. |
| 2008/0205075 | A1 | 8/2008 | Hikmet et al. |
| 2009/0217970 | A1 | 9/2009 | Zimmerman et al. |
| 2009/0219730 | A1 | 9/2009 | Syfert et al. |
| 2009/0251920 | A1 | 10/2009 | Kino et al. |

(56) References Cited

U.S. PATENT DOCUMENTS

| | | |
|---|---|---|
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0091923 A1 | 4/2012 | Kastner-Jung et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0065750 A1 | 3/2014 | Harikrishna Mohan et al. |
| 2014/0103258 A1 | 4/2014 | Agrawal et al. |
| 2014/0211498 A1 | 7/2014 | Cannon et al. |
| 2014/0264396 A1* | 9/2014 | Lowenthal .............. H01L 33/08 257/88 |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1* | 9/2015 | Salter ................ H05B 37/0218 362/84 |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 203325377 U | 12/2013 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102011076330 A1 | 11/2012 |
| DE | 202013105487 U1 | 1/2014 |
| EP | 1793261 A1 | 6/2007 |
| EP | 2453167 A1 | 5/2012 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

OTHER PUBLICATIONS

BMW Wants to Put Super-Efficient OLED Tail Lights on Your Next Car, http://www.engadget.com/2014/04/10/bmw-organic-light/, Dec., 22, 201.

3D Printed LED Lights are the World's Thinnest Ones, http://3dprintingfromscratch.com/2014/12/3d-printed-led-lights-are-the-world-thinnest-ones, Dec. 14, 2014.

* cited by examiner

PHOTOLUMINESCENT LIGHTING APPARATUS FOR VEHICLES

CROSS-REFERENCE TO RELATED APPLICATIONS

This application is a continuation-in-part of U.S. patent application Ser. No. 14/603,636, filed Jan. 23, 2015, and entitled "DOOR ILLUMINATION AND WARNING SYSTEM," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present disclosure generally relates to a vehicle lighting system, and more particularly, to vehicle lighting systems having thin profiles that may be operable to conform to non-planar surfaces.

BACKGROUND OF THE INVENTION

Lighting in vehicles traditionally has been applied to provide illumination for reading, vehicle entry, and operation. However, lighting may also be applied to improve vehicle features and systems to ensure that vehicle passengers, operators, and onlookers have an improved experience. Such improvements may arise from improvements in safety, visibility, aesthetics, and/or features. The disclosure provides for a lighting system that may be operable to illuminate a portion of a vehicle. In some embodiments, the disclosure may provide for a lighting apparatus configured to be utilized on an exterior panel of a vehicle without requiring a substantial recess to accommodate a housing for at least one light source of the apparatus. In this way, the disclosure may provide for various embodiments of light apparatuses corresponding to thin assemblies configured to be mounted on exterior surface that are substantially flush to at least one finished surface of the vehicle.

SUMMARY OF THE INVENTION

According to one aspect of the present disclosure, a vehicle taillight is disclosed. The taillight comprises an at least partially light transmissive layer and at least one light generating layer configured to substantially coat a portion of the transmissive layer. The light generating layer comprises a plurality of electrodes and a plurality of LEDs in a semiconductor ink disposed between the electrodes. The light generating layer is operable to emit an excitation emission. The taillight further comprises at least one photoluminescent layer proximate at least one of the electrodes configured to convert the excitation emission to an output emission.

According to another aspect of the present disclosure, a vehicle light assembly is disclosed. The assembly comprises an at least partially light transmissive layer and at least one light generating layer configured to coat a portion of an interior surface of the at least partially light transmissive layer. The at least partially light transmissive layer comprises a plurality of electrodes and a plurality of LEDs in a semiconductor ink disposed between the electrodes. The plurality of LEDs is operable to emit an excitation emission. The assembly further comprises at least one photoluminescent layer proximate at least one of the electrodes configured to convert the excitation emission to an output emission.

According to yet another aspect of the present disclosure, a surface mounted taillight assembly for a vehicle is disclosed. The assembly comprises an at least partially light transmissive layer, a first light generating layer, and a second light generating layer. The first light generating layer is printed in a first liquid suspension on a first portion of an interior surface of the transmissive layer and configured to emit a first emission. The second light generating layer is printed in a second liquid suspension on a second portion of the interior surface and configured to emit a second emission corresponding to a different color than the first emission.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
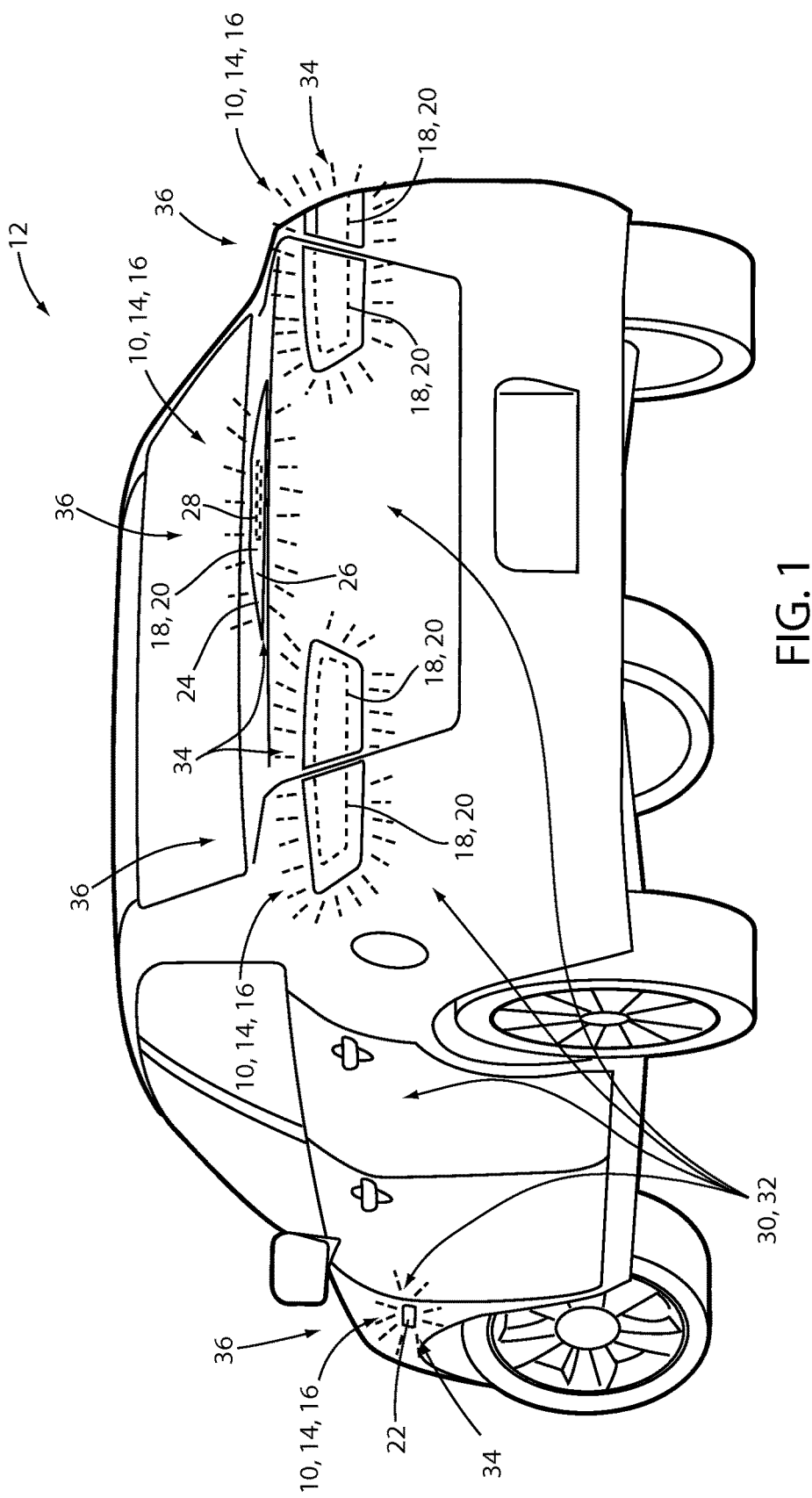
FIG. 1 is a rear perspective view of an automotive vehicle comprising at least one illumination apparatus.

Referring to FIG. 1, the disclosure describes an illumination apparatus 10 for a vehicle 12 configured provide illumination in the form of at least one lamp 14 or marker 16. As demonstrated in the exemplary embodiments of the application, the illumination apparatus 10 may be utilized to generate emissions of light in a variety of colors and may be utilized in various combinations to provide effective lighting for the vehicle 12. In some embodiments, the illumination apparatus 10 may correspond to a taillight 18, a cornering marker 20, a side marker 22, or various combinations of exterior light assemblies for the vehicle 12. For example, the illumination apparatus 10 may be utilized as a portion of a vehicle spoiler 24 comprising a running light 26 and a high mount stop light 28.

In an exemplary embodiment, the illumination apparatus 10 may correspond to a substantially thin lighting assembly configured to be mounted to an exterior surface 30 of the vehicle 12. The exterior surface 30 may significantly align with a class-A surface of the vehicle 12. In this configuration, the illumination apparatus 10 may be configured to be mounted on the surface 30 without a conventional housing and also without a corresponding opening formed in at least one panel 32 of the vehicle 12. In this configuration, the illumination apparatus 10 may be configured to be utilized on surfaces (e.g. exterior surfaces 30) of the vehicle 12 that may not be configured to receive conventional taillight housings. That is, in some embodiments, the illumination apparatus 10 may be configured to be applied to one or more surfaces of the vehicle 12 that are substantially flush with class-A surfaces of the vehicle 12. Though specific examples are provided herein, the illumination apparatus 10 may be implemented in various interior and/or exterior panels of the vehicle 12 and may generally be configured to illuminate portions of the vehicle 12.

As referred to herein, a class-A surface of the vehicle 12 may correspond to a finished or painted surface of the vehicle 12. For example, a class-A surface may correspond to an exterior surface of any panel of the vehicle 12, which may be accessible to an onlooker of the vehicle 12. A class-A surface may conversely not ordinarily apply to an interior panel surface or unfinished surface of the vehicle 12 configured to accommodate a housing or other features that may not be visible in an assembled configuration. Though discussed in reference to a class-A surface or finished surface, the illumination apparatus 10 and the various corresponding light producing assemblies described herein may be utilized in connection with various surfaces of the vehicle 12.

The illumination apparatus 10 may include a light producing assembly 34 corresponding to a thin, flexible lighting assembly. As discussed in reference to FIG. 1, the illumination apparatus 10 generally refers to various lighting components disposed on the vehicle 12. Exemplary embodiments of the illumination apparatus 10 are discussed in detail in the following description. For purposes of this disclosure, a vehicle fixture or panel may refer to any interior or exterior piece of vehicle equipment, or a part thereof, suitable for receiving the illumination apparatus 10 as described herein. While the implementations of the illumination apparatus 10 described herein are primarily directed to automotive vehicle use, it should be appreciated that the apparatus or system may also be implemented in other types of vehicles designed to transport one or more passengers such as, but not limited to, watercraft, aircraft, trains, mass transit, etc.

The light producing assembly 34 may be operable to emit an output emission 36. The output emission 36 is demonstrated by the dashed lines extending from the light producing assembly 34. The light producing assembly 34 may have a thin profile and be of flexible materials providing for the assembly to conform to non-planar surfaces which may correspond to the exterior surfaces 30 of the vehicle 12. Although specific examples of the illumination apparatus 10 are discussed in reference to at least one taillight 18 of the vehicle 12, it should be appreciated that the illumination apparatus 10 may be implemented as various lights or lighting assemblies in various portions of the vehicle 12.

In an exemplary embodiment, the light producing assembly 34 is in communication with a controller and/or at least one exterior lighting control line. In this configuration, the light producing assembly 34 of the illumination apparatus 10 may be configured to selectively activate in response to at least one control state of the vehicle 12. For example, the illumination apparatus may be configured to illuminate in response to a lighting signal configured to activate a running light operation and/or a brake light operation of the vehicle 12. The controller and/or one or more mechanical or electromechanical switches may be configured to selectively activate the light producing assembly 34 in response to the lighting signal, which may be received from a variety of vehicle control systems. For clarity, the illumination apparatus 10 is discussed hereinafter as being in communication with the controller configured to selectively activate the light producing assembly 34. An exemplary embodiment of the controller is discussed in reference to FIG. 11.

The controller may be in communication with various control modules and systems of the vehicle 12 such that the controller may selectively illuminate the illumination apparatus 10 to correspond to one or more states of the vehicle 12. A state of the vehicle 12 may correspond to at least one of a locked/unlocked condition, a lighting condition, a driving condition, a drive gear selection, a door ajar condition, a running light activation, a brake light activation or any other condition that may be sensed or activated by various control modules and systems of the vehicle 12. The various configurations of the illumination apparatus 10 may provide for beneficial, operational lighting that may be efficiently incorporated on at least one exterior surface 30 of the vehicle 12.

Figure 2:
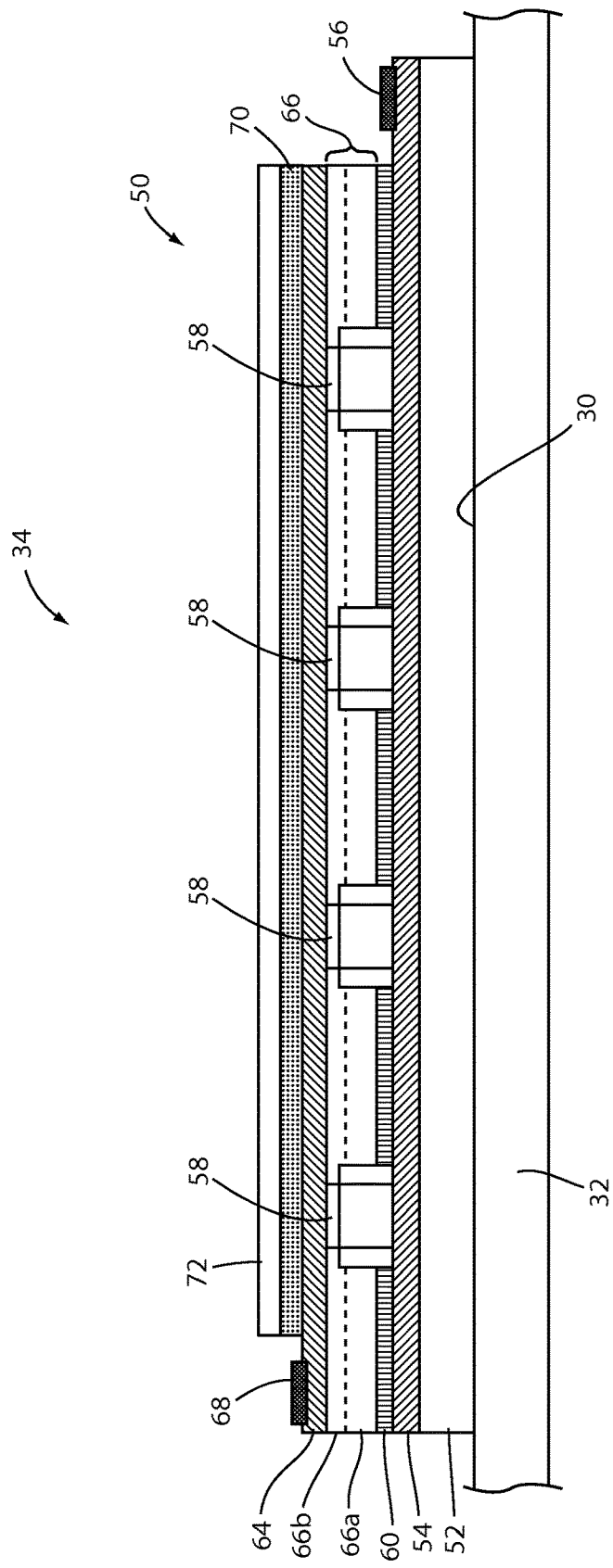
FIG. 2 is a detailed side view of a light producing assembly.

Referring to FIG. 2, the light producing assembly 34 may correspond to a thin-film or printed light emitting diode (LED) assembly. The light producing assembly 34 may comprise a circuit 50 having a substrate 52. The substrate 52 may be opaque, transparent, or semitransparent and may be thin. The light producing assembly 34 may be utilized in a variety of applications, which may have a thin overall thickness. The substrate 52 may be of a polymer, for example polycarbonate, poly-methyl methacrylate (PMMA), polyethylene terephthalate (PET), etc. In some embodiments, the substrate 52 may be dispensed from a roll to provide for integration into assembly operations for the light producing assembly 34 and may be approximately 0.1 mm to 1.5 mm thick.

A first electrode 54 or conductive layer may be disposed on the substrate 52. The first electrode 54 and/or various electrodes or conductive layers discussed herein may comprise a conductive epoxy, such as a silver-containing or copper-containing epoxy. The first electrode 54 may be conductively connected to a first bus bar 56. The first bus bar 56 and other bus bars or conduits discussed herein may be of metallic and/or conductive materials, which may be screen printed on the electrodes or conductive layers. The bus bars may be utilized in the light producing assembly 34 to conductively connect a plurality of light-emitting diode (LED) sources 58 to a power source via the controller. In this way, the first bus bar 56, and other bus bars utilized in the light producing assembly, may be configured to uniformly deliver current along and/or across a surface of the light producing assembly 34.

The LED sources 58 may be printed, dispersed or otherwise applied to the first electrode 54 via a semiconductor ink 60. The semiconductor ink may correspond to a liquid suspension comprising a concentration of LED sources 58 dispersed therein. The concentration of the LED sources may vary based on a desired emission intensity of the light producing assembly 34. The LED sources 58 may be dispersed in a random or controlled fashion within the semiconductor ink 60. The LED sources 58 may correspond to micro-LEDs of gallium nitride elements, which may be approximately 5 microns to 400 microns across a width substantially aligned with the surface of the first electrode 54. The semiconductor ink 60 may include various binding and dielectric materials including but not limited to one or more of gallium, indium, silicon carbide, phosphorous and/or translucent polymeric binders. In this configuration, the semiconductor ink 60 may contain various concentrations of LED sources 58 such that a surface density of the LED sources 58 may be adjusted for various applications.

In some embodiments, the LED sources 58 and semiconductor ink 60 may be sourced from Nth Degree Technologies Worldwide Inc. The semiconductor ink 60 can be applied through various printing processes, including ink jet and silk screen processes to selected portion(s) of the substrate 52. More specifically, it is envisioned that the LED sources 58 may be dispersed within the semiconductor ink 60, and shaped and sized such that a substantial quantity of them preferentially align with the first electrode 54 and a second electrode 64 during deposition of the semiconductor ink 60. The portion of the LED sources 58 that ultimately are electrically connected to the electrodes 54, 64 may be illuminated by a voltage source applied across the first electrode 54 and the second electrode 64. In some embodiments, a power source derived from a vehicular power source may be employed as a power source to supply current to the LED sources 58. Additional information regarding the construction of a light producing assembly similar to the light producing assembly 34 is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

At least one dielectric layer 66 may be printed over the LED sources 58 to encapsulate and/or secure the LED sources 58 in position. The at least one dielectric layer 66 may correspond to a first dielectric layer 66a and a second dielectric layer 66b, which may be of a substantially transparent material. The second electrode 64 may correspond to a top transparent conductive layer printed over the dielectric layer 66 to electrically connect the electrodes 54, 64. The second electrode 64 may be conductively connected to a second bus bar 68. The bus bars 56, 68 may be utilized in the light producing assembly 34 to conductively connect a plurality of LED sources 58 to the power source via the controller. Though the plurality of LED sources 58 are discussed as connected to the controller via the bus bars 56, 68, in some embodiments, the controller may supply current to the LED sources 58 via various forms of conductive leads or traces configured to conductively connect the controller to the first electrode 54 and the second electrode 64. An exemplary embodiment of the controller is discussed in reference to FIG. 11.

In some embodiments, the first electrode 54 and the second electrode 64 may correspond to an anode electrode and a cathode electrode. Though described as an anode and a cathode of the light producing assembly 34, the first electrode 54 and the second electrode 64 may be arranged such that the second electrode 64 (cathode) is disposed on the substrate and the first electrode 54 (anode) is disposed on the at least one dielectric layer 66. Additionally, a reflective layer which may be of a metallic reflective material may be disposed between the substrate 52 and the first electrode 54 to reflect light emitted from the cathode outward from the substrate 52 through the second electrode 64. The bus bars 56, 68 may be printed along opposite edges of the electrodes 54, 64 and electrically terminate at anode and cathode terminals. Points of connection between the bus bars 56, 68 and the power source may be at opposite corners of each bus bar 56, 68 for uniform current distribution along each bus.

Still referring to FIG. 2, in some embodiments, a photoluminescent layer 70 may be applied to the second electrode 64 to form a backlit configuration of the light producing assembly 34. In some embodiments, the photoluminescent layer 70 may alternatively or additionally be configured in a front-lit configuration. The photoluminescent layer 70 may be applied as a coating, layer, film, and/or photoluminescent substrate to the second electrode 64 or any surface of the light producing assembly 34 configured to emit the output emission 36 therethrough. The photoluminescent layer 70 may be applied by screen printing, flexography, and/or otherwise affixed to the second electrode 64 or a portion of a semitransparent fixture of the vehicle 12 as discussed in reference to FIG. 9.

In various implementations, the LED sources 58 may be configured to emit an excitation emission comprising a first wavelength corresponding to blue light. The LED sources 58 may be configured to emit the excitation emission into the photoluminescent layer 70 such that the photoluminescent material becomes excited. In response to the receipt of the excitation emission, the photoluminescent material converts the excitation emission from the first wavelength to the output emission 36 comprising at least a second wavelength longer than the first wavelength. Additionally, one or more coatings 72 or sealing layers may be applied to an exterior surface of the light producing assembly 34 to protect the photoluminescent layer 70 and various other portions of the light producing assembly 34 from damage and wear.

Figure 3:
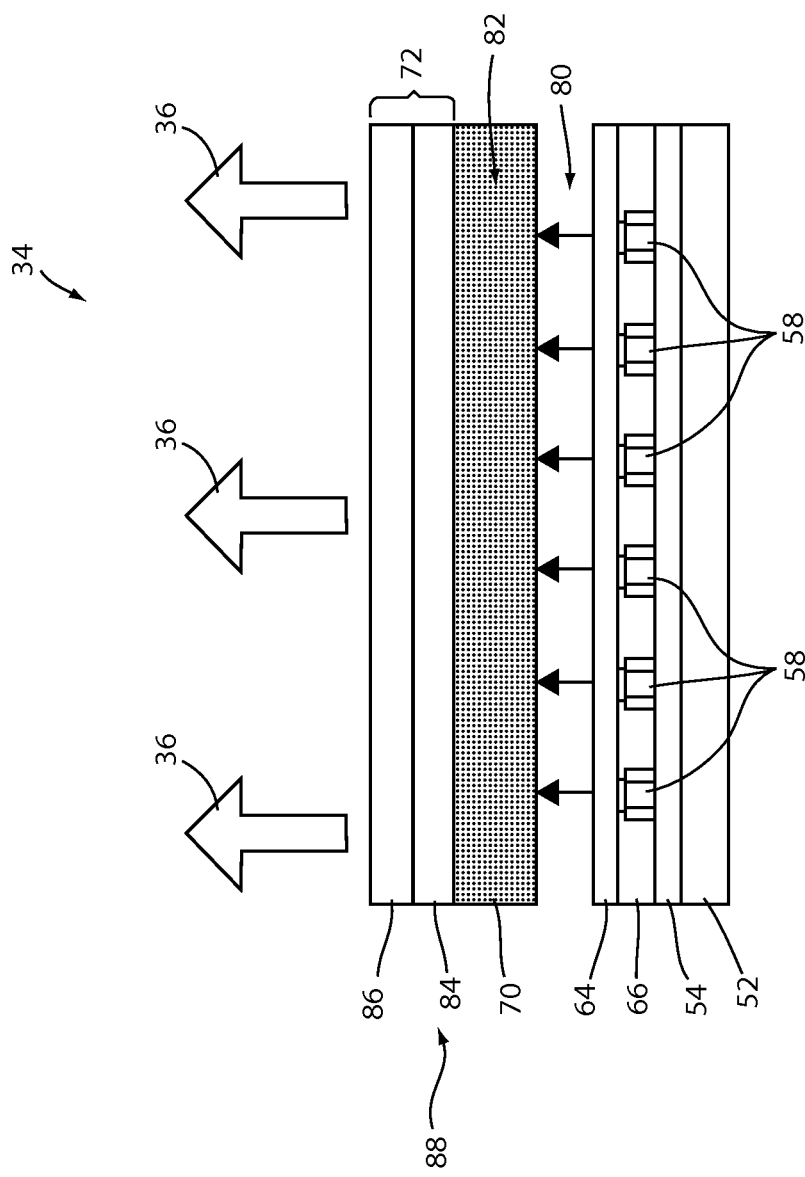
FIG. 3 is a side view of a light producing assembly demonstrating a photoluminescent layer configured to convert a wavelength of light.

Referring now to FIG. 3, a detailed view of photoluminescent layer 70 of the light producing assembly 34 in a backlit configuration is shown. The light producing assembly 34 is configured similar to the light producing assembly 34 demonstrated in FIG. 2, with like-numbered elements having the same or comparable function and structure. Though not shown in FIG. 3, the LED sources 58 are in electrical communication with the bus bars 56, 68 and a power source via the controller such that the controller may selectively activate an excitation emission 80 from LED sources 58.

In an exemplary implementation, the excitation emission 80 may comprise a first wavelength corresponding to a blue, violet, and/or ultra-violet spectral color range. The blue spectral color range comprises a range of wavelengths generally expressed as blue light (~440-500 nm). In some implementations, the first wavelength may comprise a wavelength in the ultraviolet and near ultraviolet color range (~100-450 nm). In an exemplary implementation, the first wavelength may be approximately equal to 470 nm. Though particular wavelengths and ranges of wavelengths are discussed in reference to the first wavelength, the first wavelength may generally be configured to excite any photoluminescent material.

In operation, the excitation emission 80 is transmitted into an at least partially light transmissive material of the photoluminescent layer 70. The excitation emission is emitted from the LED sources 58 and may be configured such that the first wavelength corresponds to at least one absorption wavelength of one or more photoluminescent materials disposed in the photoluminescent layer 70. For example, the photoluminescent layer 70 may comprise an energy conversion layer 82 configured to convert the excitation emission 80 at the first wavelength to an output emission 36 having a second wavelength, different from the first wavelength. The output emission 36 may comprise one or more wavelengths, one of which may be longer than the first wavelength. The conversion of the excitation emission 80 to the output emission 36 by the energy conversion layer 82 is referred to as a Stokes shift.

In some embodiments, the output emission 36 may correspond to a plurality of wavelengths. Each of the plurality of wavelengths may correspond to significantly different spectral color ranges. For example, the at least second wavelength of the output emission 36 may correspond to a plurality of wavelengths (e.g. second, third, etc.). In some implementations, the plurality of wavelengths may be combined in the output emission 36 to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm. In some implementations, a blue or blue green wavelength may correspond to the excitation emission being combined with the output emission 36. As discussed herein, a concentration of the photoluminescent material may be configured to allow at least a portion of the excitation emission to be emitted with the output emission 36 to add a blue hue to the output emission 36. The plurality of wavelengths may be utilized to generate a wide variety of colors of light from the each of the photoluminescent portions converted from the first wavelength. Though the particular colors of red, green, and blue are referred to herein, various photoluminescent materials may be utilized to generate a wide variety of colors and combinations to control the appearance of the output emission 36.

The photoluminescent materials, corresponding to the photoluminescent layer 70 or the energy conversion layer 82, may comprise organic or inorganic fluorescent dyes configured to convert the excitation emission 80 to the output emission 36. For example, the photoluminescent layer 70 may comprise a photoluminescent structure of rylenes, xanthenes, porphyrins, phthalocyanines, or other materials suited to a particular Stokes shift defined by an absorption range and an emission fluorescence. In some embodiments, the photoluminescent layer 70 may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the excitation emission 80 configured to excite one or more photoluminescent materials to emit an output emission having a desired color.

Still referring to FIG. 3, the light producing assembly 34 may further include the coating 72 as at least one stability layer 84 configured to protect the photoluminescent material contained within the energy conversion layer 82 from photolytic and/or thermal degradation. The stability layer 84 may be configured as a separate layer optically coupled and adhered to the energy conversion layer 82. The stability layer 84 may also be integrated with the energy conversion layer 82. The photoluminescent layer 70 may also optionally include a protection layer 86 optically coupled and adhered to the stability layer 84 or any layer or coating to protect the photoluminescent layer 70 from physical and chemical damage arising from environmental exposure.

The stability layer 84 and/or the protection layer 86 may be combined with the energy conversion layer 82 to form an integrated photoluminescent structure 88 through sequential coating or printing of each layer, or by sequential lamination or embossing. Additionally, several layers may be combined by sequential coating, lamination, or embossing to form a substructure. The substructure may then be laminated or embossed to form the integrated photoluminescent structure 88. Once formed, the photoluminescent structure 88 may be applied to a surface of at least one of the electrodes 54, 64 such that the excitation emission 80 received from the LED sources 58 may be converted to the output emission 36. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Referring now to FIGS. 4, 5, 6 and 7, various embodiments of light producing assemblies are described. Each of the light producing assemblies may be configured to emit a first output emission 92, which may correspond to the output emission 36, and a second output emission 94. In some embodiments, the first output emission 92 and the second output emission 94 are emitted in response to the activation of at least one excitation emission, for example, the excitation emission 80. A designation of a, b, c, etc. may be utilized to distinguish particular examples of elements referenced in each of the assemblies discussed herein; however, it shall be understood that each of the elements may be substituted or produced from various combinations of embodiments of the light producing assemblies discussed herein. Though the light producing assemblies are discussed in reference to particular embodiments, the various features, characteristics, and/or constructions of each of the light producing assemblies discussed herein may be combined based on the teachings of the disclosure.

Figure 4:
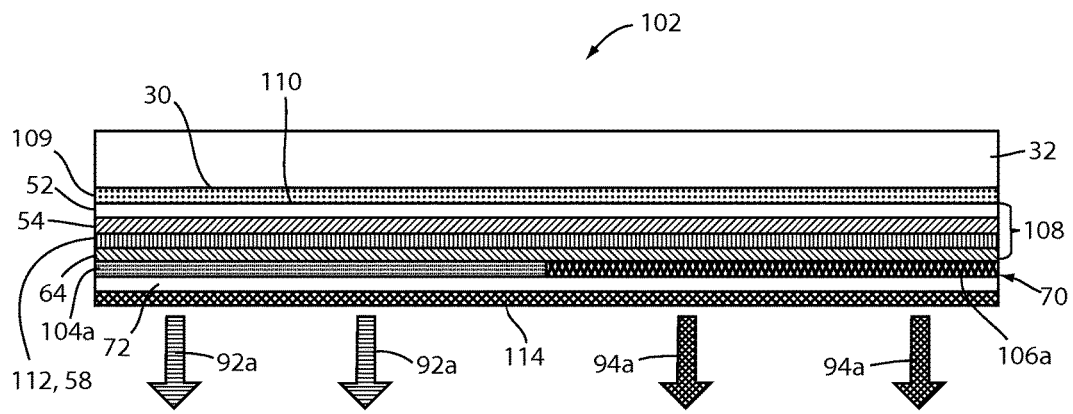
FIG. 4 is a detailed side view of an implementation of a single source light producing assembly disposed on a surface of a vehicle.

Referring to FIG. 4, a detailed side view illustrating an implementation of a single source light producing assembly 102 is shown disposed on the exterior surface 30. The single source light producing assembly 102 may comprise similar elements to the light producing assembly 34 having similar portions like-numbered for clarity. The single source light producing assembly (hereinafter the assembly 102) may be configured to emit the excitation emission 80 to illuminate a first photoluminescent portion 104a in the first output emission 92a and a second photoluminescent portion 106a in the second output emission 94a. In this configuration, the assembly 102 may be operable to illuminate a first portion of the illumination apparatus 10 in a first color of light by emitting the first output emission 92a and a second portion of the illumination apparatus 10 in a second color of light by emitting the second output emission 94a.

The assembly 102 is shown in connection with the exterior surface 30, which may correspond to at least one panel 32 or fixture of the vehicle 12. The assembly 102 may be affixed to the exterior surface 30 by an adhesive layer 109. The adhesive layer 109 may correspond to various forms of adhesive, for example acrylic adhesive, epoxy adhesive, etc. In this way, the assembly 102 may be affixed to the exterior surface 30 substantially flush with one or more class-A surfaces of the at least one panel 32.

A mounting surface 110 of the assembly 102 may correspond to the substrate 52 or a film layer. The substrate 52 may correspond to a layer of dielectric material configured to protect and electrically insulate an emitting layer 108 of the assembly 102. The emitting layer 108 may be configured to emit the excitation emission 80. The emitting layer 108 may comprise the first electrode 54 and the second electrode 64 with a printed LED layer 112 comprising the LED sources 58 printed on a surface therebetween. The printed LED layer 112 may be applied to at least one of the electrodes via a liquid suspension comprising a concentration of the LED light sources 58 dispersed therein. The controller may be operable to activate the excitation emission 80 to be emitted from the emitting layer 108 by communicating a signal via the first bus bar 56 and the second bus bar 68.

In response to receiving the excitation emission 80, the first photoluminescent portion 104a and the second photoluminescent portion 106a are configured to emit the first output emission 92a and the second output emission 94a, respectively. The output emissions 92a and 94a may be generated by each of photoluminescent materials in the energy conversion layers 82 of the corresponding photoluminescent portions 104a and 106a. In this configuration, the controller may activate the first output emission 92a to illuminate a first portion of an illumination apparatus in the first color of light by controlling the excitation emission 80. The controller may also activate the second output emission 94a to illumination a second portion of the illumination apparatus in a second color of light different from the first color by controlling the excitation emission 80. As discussed in reference to FIG. 8, the first portion of an illumination apparatus may correspond to a first illuminated design and the second portion of the illumination apparatus may correspond to a second illuminated design.

As previously discussed, the color of an output emission from each of the photoluminescent portions discussed herein may be controlled by one or more photoluminescent materials utilized in the energy conversion layers of each of the photoluminescent portions. For example, the first photoluminescent portion 104a may be configured to emit a substantially red light as the first output emission 92a and the second photoluminescent portion 106a may be configured to emit a substantially orange light as the second output emission 94a. In this configuration, the controller may activate the printed LED layer 112 to illumination each the photoluminescent portion s 104a and 106a to emit the first color of light and the second color of light.

The assembly 102 may further comprise the coating 72 as at least one stability layer 84 configured to protect the photoluminescent material contained within the energy conversion layer 82 from photolytic and/or thermal degradation. The coating 72 may further comprise a protection layer 86 optically coupled and adhered to the stability layer 84 or any layer or coating to protect the photoluminescent layer 70 from physical and chemical damage arising from environmental exposure. In some embodiments, the assembly 102 may further comprise a diffuser layer 114 configured to blend and diffuse each of the output emissions (e.g. the first output emission 92a and the second output emission 94a) emitted from the assembly 102. The diffuser layer 114 may be of various light transmissive materials and in an exemplary embodiment may correspond to an optical diffuser film of polymeric or glass material.

Figure 5:
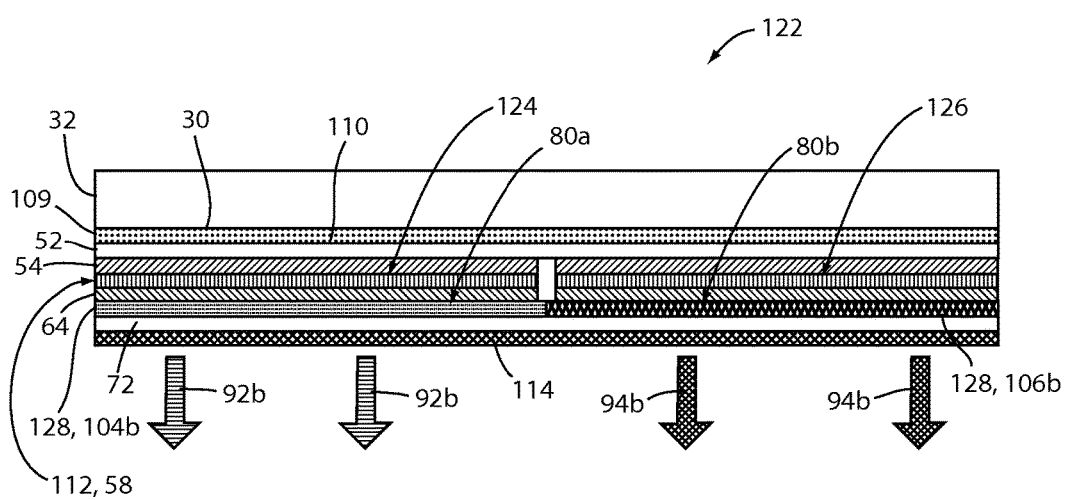
FIG. 5 is a detailed side view of an implementation of a multiple source light producing assembly disposed on a surface of a vehicle.

Referring to FIG. 5, a detailed side view illustrating an implementation of a multiple source light producing assembly 122 is shown disposed on the exterior surface 30. The multiple source light producing assembly 122 may share at least some similar features to the single source light producing assembly 102. As discussed in reference to FIG. 4, the description of like-numbered features may be omitted for clarity. The multiple source light producing assembly 122 (hereinafter the assembly 122) may be configured to emit the first output emission 92b and the second output emission 94b independently.

In order to provide for the independent activation of the first output emission 92b and the second output emission 94b, the controller may be in communication with a first emitting layer 124 and a second emitting layer 126 of the assembly 122. The first emitting layer 124 may be configured to emit a first excitation emission 80a to illuminate the first photoluminescent portion 104b in the first output emission 92b. The second emitting layer 126 may be configured to emit a second excitation emission 80b to illuminate the second photoluminescent portion 106b in the second output emission 94b. In this configuration, the assembly 122 may be operable to independently illuminate a first portion of the illumination apparatus 10 in a first color of light by emitting the first output emission 92b or a second portion of the illumination apparatus 10 in a second color of light by emitting the second output emission 94b.

As discussed previously, the output emissions 92b and 94b may be generated by each of photoluminescent materials in the energy conversion layers 82 of the corresponding photoluminescent portions 104b and 106b. Each of the emitting layers 124 and 126 may be configured to emit the excitation emissions 80a and 80b at similar wavelengths or substantially different wavelengths. One or more wavelengths output by the LED sources 58 corresponding to each of the emitting layers 124 and 126 may be configured to align with absorption ranges of one or more photoluminescent materials utilized in each of the respective photoluminescent portions 104b and 106b. In this configuration, the controller may activate the first emitting layer 124 to emit the excitation emission 80a to excite the first photoluminescent portion 104b and activate the second emitting layer 126 to emit the excitation emission 80b to excite the second photoluminescent portion 106b.

In some implementations, the first photoluminescent portion 104b and the second photoluminescent portion 106b may correspond to a combined photoluminescent layer 128. The combined photoluminescent layer 128 may comprise one or more photoluminescent materials configured to have substantially different absorption ranges. For example, a first photoluminescent material may have a first absorption range configured to become excited in response to receiving the first excitation emission 80a. In response to receiving the first excitation emission 80*a*, the combined photoluminescent layer 128 may emit the first output emission 92*b* in the first color.

A second photoluminescent material may have a second absorption range configured to become excited in response to receiving the second excitation emission 80*b*. In response to receiving the second excitation emission 80*b*, the combined photoluminescent layer 128 may emit the second output emission 94*b* in the second color different from the first color. The second absorption range may be significantly different from the first absorption range such that the first absorption range and the second absorption range do not significantly overlap. In this way, each of the emitting layers 124 and 126 may illuminate a portion of the combined photoluminescent layer 128. In this configuration, the combined photoluminescent layer 128 may be configured to emit each of the output emissions 92*b* and 94*b* substantially independently.

By providing for independent activation of the first emitting layer 124 and the second emitting layer 126, the controller may selectively activate the first output emission 92*b* and independently activate the second output emission 94*b* from the assembly 122. In this configuration, the output emissions 92*b* and 94*b* may be utilized to selectively illuminate a first portion of an illumination apparatus in the first color and a second portion of the illumination apparatus in a second color. The assembly 122 may provide for a cost effective and efficient means to illuminate various illumination apparatus as discussed herein. In an exemplary embodiment, the illumination apparatus may correspond to a taillight of the vehicle 12, wherein the first portion corresponds to a running light and the second portion corresponds to a cornering indicator. An exemplary embodiment of such a configuration is discussed in reference to FIG. 8.

Figure 6:
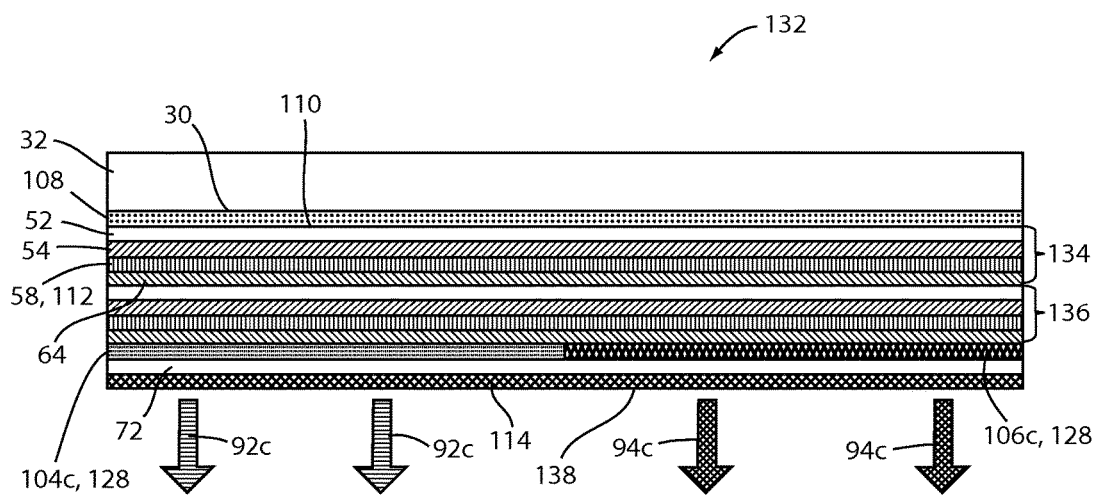
FIG. 6 is a detailed side view of an implementation of a multiple layer light producing assembly disposed on a surface of a vehicle.

Referring to FIG. 6, a detailed side view illustrating an implementation of a multiple layer light producing assembly 132 is shown disposed on the exterior surface 30. The multiple layer light producing assembly 132 may share at least some similar features to the single source light producing assembly 102. As such, the description of like-numbered features may be omitted for clarity. The multiple layer light producing assembly 132 (hereinafter the assembly 132) may be configured to emit the first output emission 92*c* and the second output emission 94*c* independently.

In order to provide for the independent activation of the first output emission 92*c* and the second output emission 94*c*, the controller may be in communication with a first stacked emitting layer 134 and a second stacked emitting layer 136 of the assembly 132. The first stacked emitting layer 134 may be configured to emit a first excitation emission 80*a* to illuminate the first photoluminescent portion 104*c* in the first output emission 92*c*. The second stacked emitting layer 136 may be configured to emit a second excitation emission 80*b* to illuminate the second photoluminescent portion 106*c* in the second output emission 94*c*. In this configuration, the assembly 132 may be operable to independently illuminate a first portion of the illumination apparatus 10 in a first color of light by emitting the first output emission 92*c* and a second portion of the illumination apparatus 10 in a second color of light by emitting the second output emission 94*c*.

The first stacked emitting layer 134 may be configured to output the first excitation emission 80*a* and the second stacked emitting layer 136 may be configured to output the second excitation emission 80*b*. In the stacked configuration, each of the stacked emitting layers 134 and 136 may be of substantially light transmissive materials such that the first excitation emission 80*a* may be transmitted through the second stacked emitting layer 136. For example, the electrodes may be of indium tin oxide (ITO) and the at least one dielectric layer 66 of the printed LED layer 112 may be of a light emissive polymer and graphene. In this configuration, each of the excitation emissions may be emitted into the photoluminescent portions 104*c* and 106*c* to generate the output emissions 92*c* and 94*c*.

As discussed in reference to the assembly 102, the output emissions 92*c* and 94*c* may be generated by each of the photoluminescent materials in the energy conversion layers 82 of the corresponding photoluminescent portions 104*c* and 106*c*. Each of the stacked emitting layers 134 and 136 may be configured to emit the excitation emissions 80*a* and 80*b* at similar wavelengths or substantially different wavelengths. The wavelength output by the LED sources 58 corresponding to each of the stacked emitting layers 134 and 136 may be configured to align with an absorption range of one or more photoluminescent materials utilized in each of the respective photoluminescent portions 104*c* and 106*c*. In this configuration, the controller may activate the first stacked emitting layer 134 to emit the excitation emission 80*a* to excite the first photoluminescent portion 104*c* and activate the second stacked emitting layer 136 to emit the excitation emission 80*b* to excite the second photoluminescent portion 106*c*.

In some implementations, the first photoluminescent portion 104*c* and the second photoluminescent portion 106*c* may correspond to a combined photoluminescent layer 128. The combined photoluminescent layer 128 may comprise one or more photoluminescent materials configured to have substantially different absorption ranges. For example, a first photoluminescent material may have a first absorption range configured to become excited in response to receiving the first excitation emission 80*a*. In response to receiving the first excitation emission 80*a*, the combined photoluminescent layer 128 may emit the first output emission 92*c* in the first color.

A second photoluminescent material may have a second absorption range configured to become excited in response to receiving the second excitation emission 80*b*. In response to receiving the second excitation emission 80*b*, the combined photoluminescent layer 128 may emit the second output emission 94*c* in the second color different from the first color. The second absorption range may be significantly different from the first absorption range such that the first absorption range and the second absorption range do not significantly overlap. In this way, each of the stacked emitting layers 134 and 136 may illuminate the combined photoluminescent layer 128. In this configuration, the combined photoluminescent layer 128 may be configured to emit each of the output emissions 92*c* and 94*c* substantially independently.

When utilizing the combined photoluminescent layer 128 in the multiple layer light producing assembly 132, the portion of the illumination apparatus from which the first output emission 92*c* and the second output emission 94*c* are emitted may coincide. That is, the assembly 132 may be configured to selectively emit the first output emission 92*c* and the second output emission 94*c* from an outer surface 138 of the assembly 132 such that the first output emission 92*c* and the second output emission 94*c* may be output from substantially the same surface. In this configuration, a single portion of a lighting apparatus as discussed herein may be configured to selectively emit the first output emission 92*c* in a first color and the second output emission 94*c* in a second color. Such an apparatus may be operable to utilize a single portion of the lighting apparatus to selectively output a running light emission in the first color and a cornering notification emission in the second color. That is, a coincident surface portion of the assembly 132 may selectively emit the first color or the second color.

Figure 7:
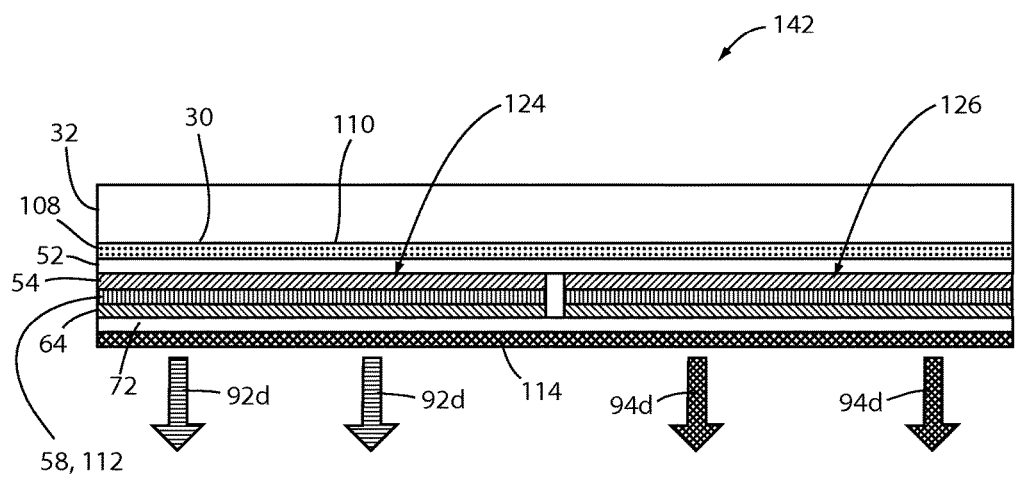
FIG. 7 is a detailed side view of an implementation of a direct output light producing assembly disposed on a surface of a vehicle.

Referring to FIG. 7, a detailed side view illustrating an implementation of a direct output light producing assembly 142 is shown disposed on the exterior surface 30. The direct output light producing assembly 142 may share at least some similar features to the single source light producing assembly 102. As such, the description of like-numbered features may be omitted for clarity. The direct output light producing assembly 142 (hereinafter the assembly 142) may be configured to emit the first output emission 92d and the second output emission 94d independently.

In order to provide for the independent activation of the first output emission 92d and the second output emission 94d, the controller may be in communication with a first emitting layer 124 and a second emitting layer 126 of the assembly 122. The first emitting layer 124 may be configured to emit the first output emission 92d directly from the LED sources 58 of the printed LED layer 112. The second emitting layer 126 may be configured to emit the second output emission 94d directly from the LED sources 58 of the printed LED layer 112. In this configuration, the assembly 142 may be operable to independently illuminate a first portion of the illumination apparatus 10 in a first color of light by emitting the first output emission 92d and a second portion of the illumination apparatus 10 in a second color of light by emitting the second output emission 94d.

Figure 8:
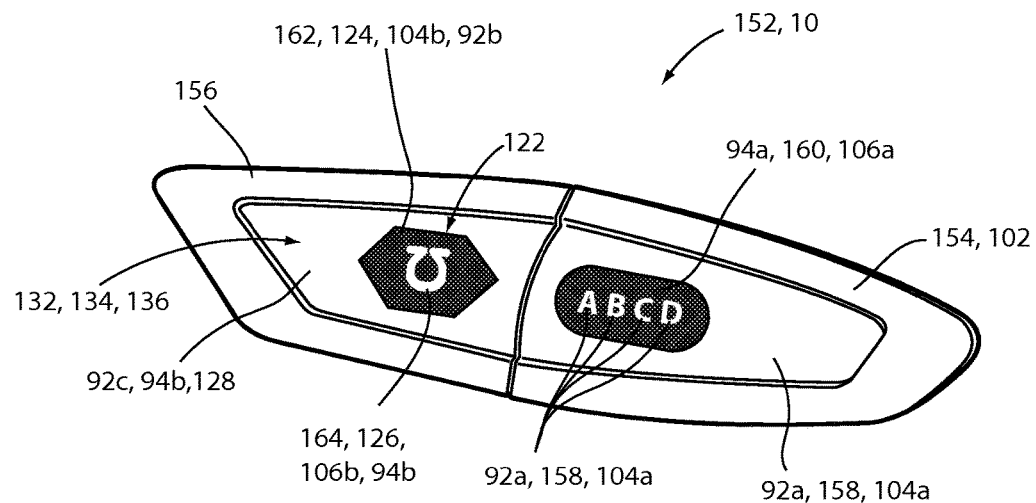
FIG. 8 is a front view of an exemplary embodiment of a taillight assembly employing an implementation of a lighting apparatus.

Referring now to FIG. 8, a front view of an exemplary embodiment of a taillight assembly 152 employing an implementation of the illumination apparatus 10 is shown. The taillight assembly 152 comprises a first portion 154, which may correspond to a running light and a second portion 156, which may correspond to a combination emitter incorporating both a running light and a cornering indicator. The first portion 154 may correspond to the single source light producing assembly 102 comprising similar elements configured to emit the output emissions 92a and 94a therefrom. The first portion 154 may comprise a first illuminated design 158 and a second illuminated design 160.

Referring now to FIGS. 4 and 8, each of the illuminated designs discussed herein may (e.g. the first illuminated design 158 and the second illuminated design 160) may correspond to any shape, character, form, or design formed by at least one of a photoluminescent portion and/or an emitting portion of a light producing assembly as described herein. The first illuminated design 158 may correspond to the first photoluminescent portion 104a of the single source light producing assembly 102. The second illuminated design 160 may correspond to the second photoluminescent portion 106a of the single source light producing assembly 102. In some embodiments, the first photoluminescent portion 104a and the second photoluminescent portion 106a may form complementary shapes, wherein each shape outlines the other. As shown, the first photoluminescent portion 104a and the second photoluminescent portion 106a may be printed and/or distributed on the light emitting layer 108 to form various design, such as the first illuminated design 158 and the second illuminated design 160.

Referring now to FIGS. 6 and 8, the second portion 156 may comprise the multiple layer light producing assembly 132. In this configuration, the controller may selectively activate the first stacked emitter 134 to illuminate the second portion 156 to emit the first output emission 92c in a substantially red light. The first output emission 92c may correspond to a running light of the taillight assembly 152. The controller may also independently and selectively activate the second stacked emitter 136 to illuminate the second portion 156 to emit the second output emission 94c in a substantially red-orange light. The second output emission 94c may correspond to a cornering indicator light of the taillight assembly 152. In this configuration, the second portion 156 may correspond to a combination emitter incorporating both a running light and a cornering indicator.

Referring now to FIGS. 5 and 8, the second portion may further comprise a third illuminated design 162 and a fourth illuminated design 164 formed by the multiple source light producing assembly 122. The third illuminated design 162 may correspond to the first emitting layer 124 configured to illuminate the first photoluminescent portion 104b in the first output emission 92b. The first photoluminescent portion 104b may comprise one or more photoluminescent materials configured to output the first output emission 92b in a substantially green color. The fourth illuminated design 164 may correspond to the second emitting layer 126 configured to illuminate the second photoluminescent portion 106b in the second output emission 94b. The second photoluminescent portion 106b may comprise one or more photoluminescent materials configured to output the second output emission 94b in a substantially white color. In this configuration, the controller may be operable to selectively illuminate the third illuminated design 162 and/or the fourth illuminated design 164 independently.

As demonstrated in FIG. 8, each of the light emitting assemblies discussed herein may be implemented alone or in combination to illuminate at least a portion of an illumination apparatus for the vehicle 12. In this way, the disclosure provides for a variety of lighting assemblies that may be implanted on various portions of the vehicle 12. In each of the embodiments discussed herein, the light emitting layers of the light producing assemblies may be selectively activated by at least one controller electrically connected to the electrodes (e.g. the first electrode 54 and the second electrode 64 of each respective emitting layer). In this way, the various light emitting assemblies may be combined and configured to produce a wide variety of illumination apparatuses, devices, and assemblies that may be utilized to illuminate various portions of the vehicle 12.

Figure 9:
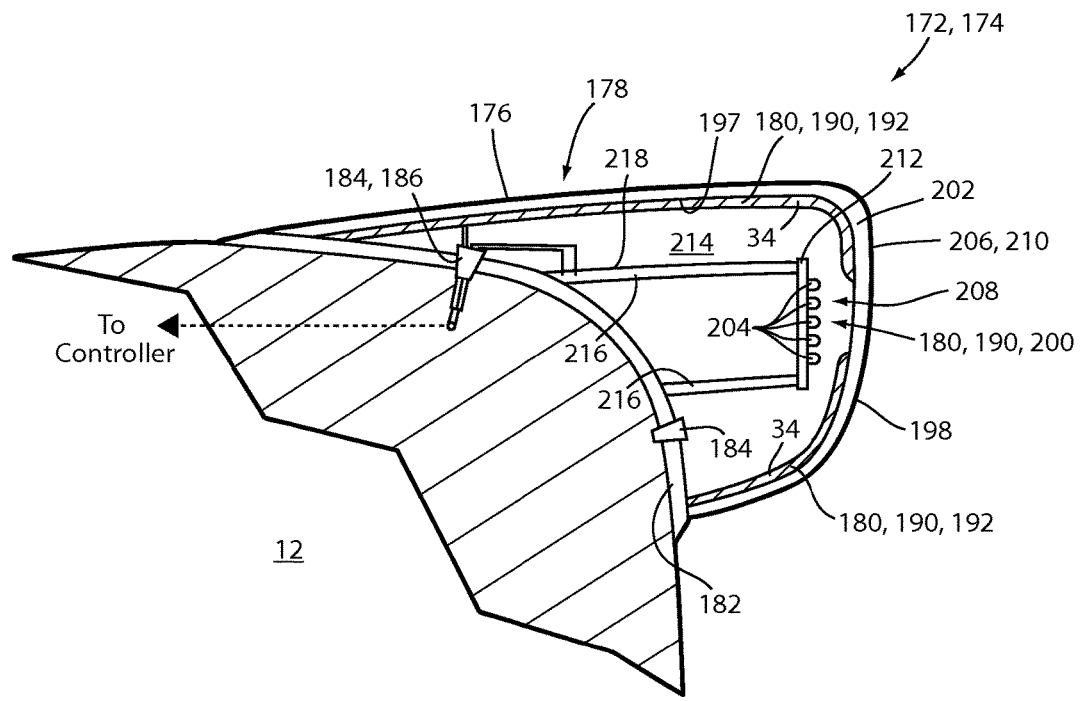
FIG. 9 is a side cross-sectional view of a spoiler employing an implementation of a lighting apparatus.
Figure 10:
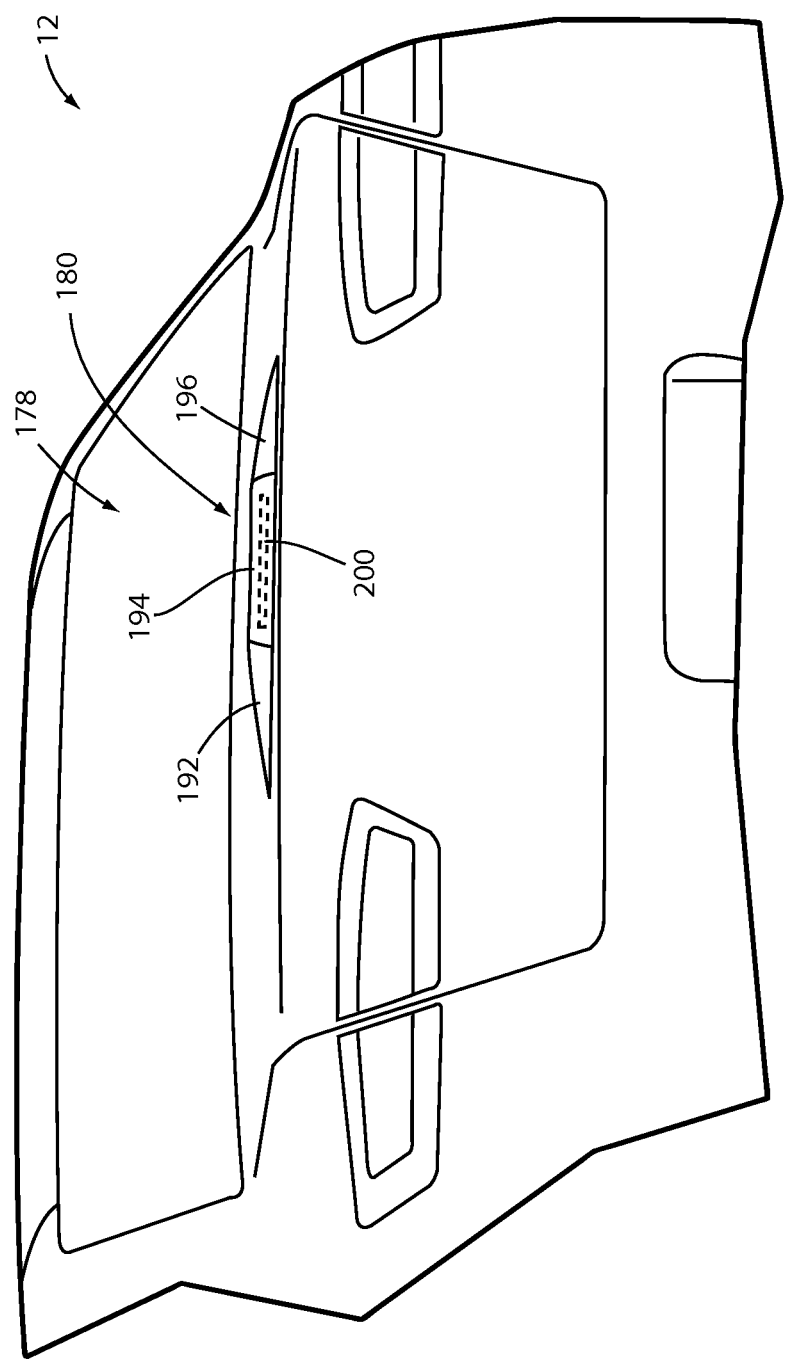
FIG. 10 is a partial rear view of the vehicle comprising the spoiler introduced in reference to FIG. 9.

Referring to FIGS. 9 and 10, an exemplary embodiment of an exterior panel 172 of the vehicle 12 having one or more structures corresponding to the illumination apparatus 10 is shown. The exterior panel 172 may correspond to a spoiler 174, wind foil, or any exterior vehicle feature. Referring now to FIG. 9, a side cross-sectional view of the spoiler 174 is shown. The spoiler 174 may be in communication with a controller as discussed herein and/or one or more control circuits configured to selectively illuminate an at least partially light transmissive exterior housing 176 forming a cover of a lighting assembly 178. The housing 176 may be of various light transmissive materials and in some embodiments may be of an impact resistant, polymeric material configured to transmit light emitted from one or more light sources 180 therethrough.

The housing 176 may be mechanically attached, laminated, adhered to and/or otherwise attached to a mounting fixture 182, which is further attached to the vehicle 12. The mounting fixture 182 may be of a variety of materials, for example at least one polymeric materials molded to conform to the at least one panel 32 of the vehicle 12. The mounting fixture 182 may be attached to the panel 32 via one or more retention clips 184 configured to engage a hole or slot in the panel 32. One of the retention clips 184 may correspond to a combination conductive connector and retention clip referred to hereinafter as a wiring clip 186. In this configuration, the light sources 180 of the lighting assembly may be in communication with the controller and/or one or more control circuits as discussed herein. An exemplary embodiment of the controller is discussed in reference to FIG. 11.

Referring now to FIGS. 9 and 10, the housing 176 may be configured to enclose and seal at least one light producing assembly 190, which may correspond to one or more or the light producing assemblies 34, 102, 122, 132, and 142 alone or in various combinations as discussed in reference to FIGS. 4-8. In an exemplary embodiment, the lighting assembly 178 may comprise a first combination emitter 192, a central emitter 194, and a second combination emitter 196. Each of the combination emitters 192 and 196 may be configured to selectively emit light in a first color or a second color to function as a running light and a cornering indicator. The central emitter 194 may configured to illuminate in the first color to provide the running light as well. Additionally, the light producing assembly may comprise a stop light emitter 200 configured to emit a high intensity light relative to the combination emitters 192 and 196 and the central emitter 194 to warn that the vehicle 12 is braking.

Each of the first combination emitter 192 and the second combination emitter 196 may be disposed on the housing 176 as the multiple layer light producing assembly 132 as similarly discussed in reference to FIG. 8. The assembly 132 may be adhered to an interior surface 197 or in some embodiments an exterior surface 198 of the housing 176. In this configuration, the controller may communicate signals via the wiring clip 186 to selectively activate the first stacked emitter 134 to emit the first output emission 92*c* in a substantially red light. The first output emission 92*c* may correspond to a running light that may be output from each of the combination emitters 192 and 196. The controller may also selectively activate the second stacked emitter 136 to emit the second output emission 94*c* in a substantially red-orange light. The second output emission 94*c* may correspond to a cornering indicator light of each of the combination emitters 192 and 196. In this configuration, the combination emitters 192 and 196 may be operable to either a running light, a cornering indicator, or both as controlled by the controller.

The central emitter 194 may correspond to a portion of the lighting assembly 178 disposed substantially between the first combination emitter 192 and the second combination emitter 196. The central emitter 194 may correspond to the light producing assembly 34 adhered to at least a portion of the housing 176 disposed between the first combination emitter 192 and the second combination emitter 196. In this configuration, the controller may selectively activate the LED sources 58 of the light producing assembly 34 to substantially illuminate the corresponding exterior surface 198 of the housing 176. Though each of the emitters 192, 194, 196, etc. discussed herein are discussed in reference to specific light producing assemblies, it shall be understood that the lighting assembly 178 may comprise various light producing assemblies and combinations thereof without departing from the spirit of the disclosure.

In some implementations, the central emitter 194 may be adhered to or otherwise attached to the interior surface 197 or the exterior surface 198 of the housing 176 and may correspond to an at least partially light transmissive layer 202. As discussed herein, the first combination emitter 192, the central emitter 194, and the second combination emitter 196 are discussed in reference to the same cross-sectional view shown in FIG. 9. It shall be understood that each of the emitters 192, 194, and 196 may correspond to separate portions of the lighting assembly 178 as shown in FIG. 10.

In reference to the central emitter 194, a brake light emission may be output from a portion thereof. For example, at least one light source 204 of the brake light emitter 200 may be configured to selectively emit a brake light indication through the at least partially light transmissive layer 202 of the light producing assembly 34. The brake light indication may further be emitted from the housing 176 and through at least one coating 206 or protective layer disposed thereon. In some embodiments, at least a portion of the light producing assembly 34 may form an opening or aperture 208 configured to provide a gap in the light producing assembly 34 for the brake light emission to efficiently pass through the housing 176 and the at least one coating 206. In this configuration, the controller may be operable to selectively activate the brake light emitter 200 to output the brake light indication to pass through at least a portion of the housing and output a notification that the vehicle 12 is braking.

The one or more coatings 206 may correspond to at least one reflective coating. For example, a reflective coating may be disposed on the exterior surface 196 of the housing 176. The one or more coatings 206 may correspond to the one or more coatings 72 or sealing layers as previously discussed herein. In an exemplary embodiment, the one or more coatings 206 may correspond to a vacuum metallized coating 210. The metallized coating may serve to provide a metallic and/or chrome appearance to the exterior surface 196 while reflecting wavelengths from environmental light outward from the lighting assembly 178. In this configuration, the lighting assembly 178 may appear to be metallic when illuminated in a front-lit configuration with ambient or environmental light. Further, upon activation of each of the emitters by the controller the vacuum metallized coating 210 may change from a metallic, reflective appearance to a red or orange glow corresponding to at least one of the running light, the cornering indicator, and the brake light indication.

The brake light emitter 200 may be mounted to the mounting fixture 182 and incorporate a circuit 212 configured to activate the at least one light source 204 corresponding to a plurality of high intensity LED sources. The light source 204 may be activated in response to at least one control signal received from the controller. Similar to the combination emitters 192 and 196, and the central emitter 194, the controller may be in communication with the brake light emitter 200 via the wiring clip 186 and further via the circuit 212. The circuit 212 may be positioned in an internal cavity 214 formed by the housing 176 and the mounting fixture 182 and one or more arms 216 of a bracket 218 disposed in the cavity 214. As discussed herein, the lighting assembly 178 provides for each of the first combination emitter 192, the central emitter 194, the second combination emitter 196, and the brake light emitter 200 to be selectively activated by the controller to emit light through the housing 176 to illuminate a corresponding portion of the lighting assembly 178.

Figure 11:
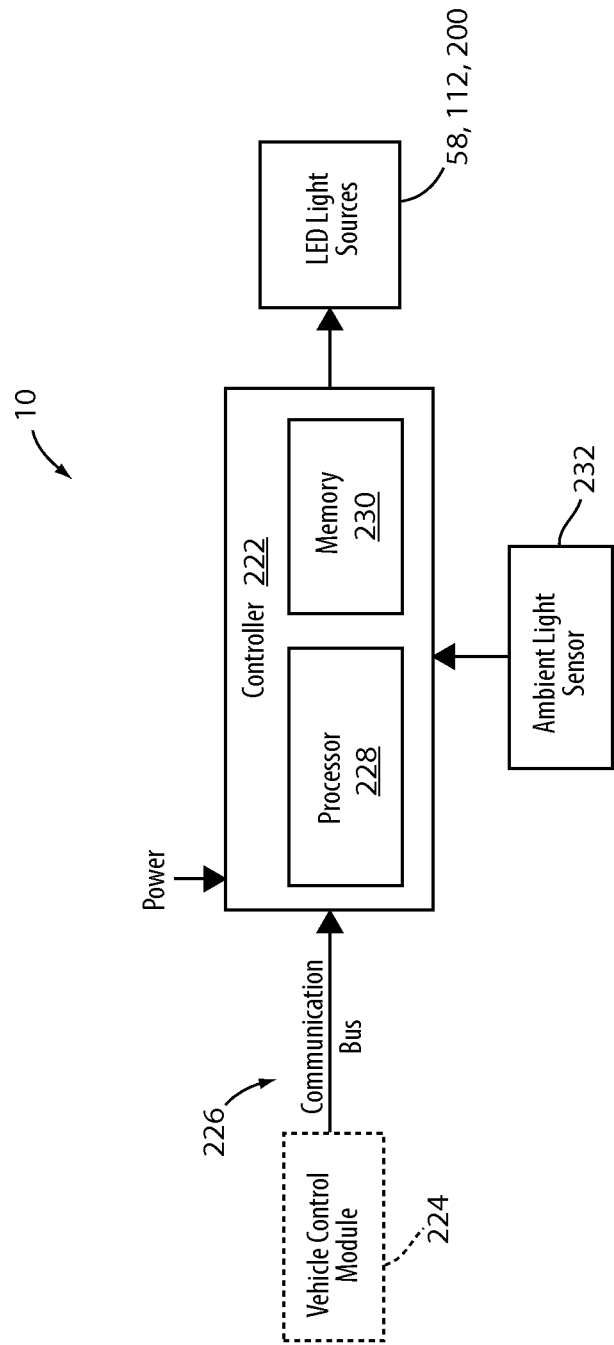
FIG. 11 is a block diagram of a lighting apparatus configured to control the illumination of a light producing assembly in accordance with the disclosure.

Referring to FIG. 11, a block diagram corresponding to the illumination apparatus 10 is shown. The controller 222 may be in communication with at least one of the light producing assemblies 34, 102, 122, 132, and/or 142 via the bus bars 56 and 68 discussed herein. The controller 222 may be in communication with the vehicle control module 224 via a communication bus 226 of the vehicle 12. The communication bus 226 may be configured to deliver signals to the controller 222 identifying various vehicle states. For example, the communication bus 226 may be configured to communicate to the controller 222 a drive selection of the vehicle, an ignition state, a door open or ajar status, a lighting state, a braking condition, a remote activation of the illumination apparatus 10, or any other information or control signals that may be utilized to activate the illumination apparatus. Though the controller 222 is discussed herein, in some embodiments, at least a portion of the illumination apparatus 10 may be activated in response to an electrical or electro-mechanical switch of the vehicle.

The controller 222 may comprise a processor 228 comprising one or more circuits configured to receive the signals from the communication bus 226 and output signals to control the illumination apparatus 10 to control the various output lights, emissions, indications, etc. as discussed herein. The processor 228 may be in communication with a memory 230 configured to store instructions to control the activation of the illumination apparatus 10. The controller 222 may further be in communication with an ambient light sensor 232. The ambient light sensor 232 may be operable to communicate a light condition, for example a level brightness or intensity of the ambient light proximate the vehicle 12. In response to the level of the ambient light, the controller 222 may be configured to adjust a light intensity output from each of the light producing assemblies, layers, emitters, and/or light source discussed herein. The intensity of the light output from the illumination apparatus 10 may be adjusted by the controller 222 by controlling a duty cycle, current, or voltage supplied to the illumination apparatus 10.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle taillight comprising:
   an at least partially light transmissive layer;
   at least one light generating layer configured to substantially coat a portion of the transmissive layer comprising:
   a plurality of electrodes;
   a plurality of LEDs in a semiconductor ink disposed between the electrodes operable to emit an excitation emission; and
   at least one photoluminescent layer proximate at least one of the electrodes configured to convert the excitation emission to an output emission.

2. The vehicle taillight according to claim 1, further comprising a base layer configured to conform to an outer surface of a panel and forming a sealed assembly with the at least partially transmissive layer.

3. The vehicle taillight according to claim 1, wherein the at least one light generating layer corresponds to a plurality of light generating layers.

4. The vehicle taillight according to claim 1, wherein the at least one photoluminescent layer corresponds to a plurality of photoluminescent layers of each of the light generating layers.

5. The vehicle taillight according to claim 4, wherein the plurality of photoluminescent layers is configured to emit a plurality of output emissions corresponding to a first wavelength and a second wavelength.

6. The vehicle taillight according to claim 5, further comprising a controller in communication with each of the light generating layers, wherein the controller is configured to activate the excitation emission of each of the light generating layers to output the first wavelength and the second wavelength independently.

7. The vehicle taillight according to claim 6, wherein the plurality of photoluminescent layers corresponds to a first photoluminescent layer and a second photoluminescent layer, the first photoluminescent layer corresponding to a first illuminated design illuminated in the first wavelength.

8. The vehicle taillight according to claim 7, wherein the second photoluminescent layer corresponds to a second illuminated design illuminated in the second wavelength.

9. A vehicle light assembly comprising:
   an at least partially light transmissive layer;
   at least one light generating layer configured to coat a portion of an interior surface of the transmissive layer comprising:
   a plurality of electrodes;
   a plurality of LEDs in a semiconductor ink disposed between the electrodes operable to emit an excitation emission; and
   at least one photoluminescent layer proximate at least one of the electrodes configured to convert the excitation emission to an output emission.

10. The light assembly according to claim 9, further comprising a base layer configured to substantially conform to an outer surface of a panel of the vehicle and forming a sealed assembly with the transmissive layer.

11. The light assembly according to claim 9, wherein the at least one photoluminescent layer corresponds to a first photoluminescent layer configured to emit a portion of the output emission as a first red emission at a first intensity in a running light configuration.

12. The light assembly according to claim 11, wherein the at least one photoluminescent layer further corresponds to a second photoluminescent layer configured to emit a portion of the output emission a substantially orange emission in a cornering marker light configuration.

13. The light assembly according to claim 11, further comprising a light emitting assembly configured to emit a portion of the output emission as a second red emission at a second intensity.

14. The light assembly according to claim 13, wherein the second red emission corresponds to a brake light emission.

15. The light assembly according to claim 9, further comprising a metallic coating disposed on the transmissive layer.

16. The light assembly according to claim 13, wherein the metallic coating is configured to reflect ambient light impinging on an outer surface of the transmissive layer and transmit at least a portion of the output emission therethrough.

17. A surface mounted taillight assembly for a vehicle comprising:
   an at least partially light transmissive layer;
   a first light generating layer printed in a first liquid suspension on a first portion of an interior surface of the transmissive layer configured to emit a first emission; and
   a second light generating layer printed in a second liquid suspension on a second portion of the interior surface and configured to emit a second emission corresponding to a different color than the first emission, wherein the first light generating layer corresponds to a first graphic configured to illuminate in the first emission and the second light generating layer corresponds to a second graphic configured to illuminate in the second emission.

18. The taillight assembly according to claim 17, wherein the second graphic forms a complementary shape to the first graphic printed in a negative of the first graphic on the transmissive layer.

\* \* \* \* \*